United States Patent
Yin

(10) Patent No.: US 9,140,911 B2
(45) Date of Patent: Sep. 22, 2015

(54) ALIGNMENT PROCESS DEVICE FOR DISPLAY PANEL AND CONDUCTIVE COMPONENT THEREOF

(75) Inventor: Fengming Yin, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/703,372

(22) PCT Filed: Sep. 13, 2012

(86) PCT No.: PCT/CN2012/081343
§ 371 (c)(1),
(2), (4) Date: Dec. 11, 2012

(87) PCT Pub. No.: WO2014/036750
PCT Pub. Date: Mar. 13, 2014

(65) Prior Publication Data
US 2015/0177537 A1    Jun. 25, 2015

(30) Foreign Application Priority Data
Sep. 6, 2012   (CN) .......................... 2012 1 0327359

(51) Int. Cl.
*H01R 12/00*  (2006.01)
*G02F 1/13*  (2006.01)
*H01R 13/24*  (2006.01)
*H01R 13/518*  (2006.01)
*G02F 1/1337*  (2006.01)
*H01R 13/424*  (2006.01)

(52) U.S. Cl.
CPC ............ *G02F 1/1303* (2013.01); *G02F 1/1337* (2013.01); *H01R 13/24* (2013.01); *H01R 13/424* (2013.01); *H01R 13/518* (2013.01); *G02F 1/1309* (2013.01)

(58) Field of Classification Search
CPC ... G02F 1/1303; G02F 1/1337; H01R 13/424; H01R 13/24; H01R 13/518
USPC .......................................................... 445/62
See application file for complete search history.

(56) References Cited

U.S. PATENT DOCUMENTS 7,281,930 B1 * 10/2007 Chen ............................... 439/79

\* cited by examiner

*Primary Examiner* — Joseph L Williams
(74) *Attorney, Agent, or Firm* — Mark M. Friedman

(57) ABSTRACT

An alignment process device for display panel is disclosed in the present invention and includes a conductive component array, which comprises at least two conductive components, and the at least two conductive components are arranged together in a form of one dimensional array, each conductive component array is utilized for contacting the display panel to provide power for the display panel; a base supports the conductive components; a power source port is connected to an external power source for providing power to the conductive components.

7 Claims, 7 Drawing Sheets

ALIGNMENT PROCESS DEVICE FOR DISPLAY PANEL AND CONDUCTIVE COMPONENT THEREOF

FIELD OF THE INVENTION

The present invention relates to a field of an alignment process for a display panel, and more particularly relates to an alignment process device for the display panel and a conductive component thereof.

BACKGROUND OF THE INVENTION

In a conventional manufacturing process of a display panel, an alignment process is required to the display panel. However, in the conventional technical solution of the alignment process of the display panel, conductive components are used to transmit voltages to the display panel. As shown in FIG. 1, the conductive component includes a pin 101, a pin sleeve 102 and a spring (not shown). The spring is disposed within the pin sleeve 102 and one end of the pin 101 is embedded within the pin sleeve 102 to contact the spring.

In the technical solution described above, the spring disposed within the pin sleeve 102 is utilized for the pin 101 to move back and forth so that the pin 101 can be properly connected to each of the contact pads in the display panel.

However, in the technical solution described above, because the size of the pin 101 is small, in order to adapt to the size of the pin 101, the size of the spring for the pin 101 is also small and therefore the expansion and contraction quantity of the spring becomes small. When the deformation of the display panel is greater and the height difference between the contact pads becomes larger, the pins 101 on the conductive components are not able to contact the contact pads on the display panel properly. As a result, the power is failed to be provided to the display panel. Therefore, the alignment process for the display panel cannot be performed.

In addition, when the conductive component works continuously, the spring of the pin 101 easily becomes fatigued and causing the conductive component to be scrapped.

In addition, because the pin 101 is embedded within the pin sleeve 102, the pin 101 is easily stuck within the pin sleeve 102 when the pin 101 is not evenly pushed by a force. Therefore, the pin 101 fails to contact the contact pad to provide power to the display panel.

Furthermore, when the pin 101 of the conductive component contacts the contact pad of the display panel to transmit power, an operator cannot immediately realize if the pin 101 on the display panel properly receives a voltage inputted. Thus, the defective rate of the display panel is difficult to decrease.

Therefore, it is necessary to provide a novel technical solution to solve the problem described above.

SUMMARY OF THE INVENTION

One object of the present invention is to provide an alignment process device for display panel to increase the elastic shifting amount of the conductive component, adapt to the condition of the enforcement of the display panel, increase the anti-fatigue ability of the conductive component, increase the usage life cycle of the alignment process device for display panel, avoid the problem that the pin is stuck by other components because of the uneven pushing to cause the pin cannot contact the contact pad of the display panel, and reduce the defective rate of the display panel.

In order to solve the problems described above, an alignment process device for display panel is provided in the present invention and includes a conductive component array, which comprises at least two conductive components, and the at least two conductive components are arranged together in a form of one dimensional array, the conductive component array is utilized for contacting the display panel to provide power for the display panel; a base supporting the conductive components; a power source port is connected an external power source for providing power to the conductive components; the conductive component includes a power source connective portion, a pin and an elastic stand, and the elastic stand includes an elastic portion, a fastened portion and a connective portion, the elastic portion includes a first end and a second end, the second end of the elastic portion is connected to the fastened portion by the connective portion, and the fastened portion is fastened in the base and the pin is fastened in the first end of the elastic portion, and the power source connective portion is disposed on the fastened portion; the power source connective portion is utilized for transmitting the power received from the power source port to the pin.

As the alignment process device for display panel described above, the pin on the elastic portion is electrically connected to the power source connective portion on the fastened portion and the power source connective portion is electrically connected to the power source port.

As the alignment process device for display panel described above, the conductive component further includes an indicator light, a first conductive wire and a second conductive wire, and the first conductive wire is connected to the indicator light and the pin, and the second conductive wire is connected to the indicator light and the power source connective portion.

As the alignment process device for display panel described above, a first fastened structure is disposed on the fastened portion and the first fastened structure is utilized to fasten the conductive component and the base together.

As the alignment process device for display panel described above, a second fastened structure array is disposed on the base, and the second fastened structure array is utilized to couple to the first fastened structure so as to fasten the conductive component and the base together.

Another object of the present invention is to provide an alignment process device for display panel to increase the elastic shifting amount of the conductive component, adapt to the condition of the enforcement of the display panel, increase the anti-fatigue ability of the conductive component, increase the usage life cycle of the alignment process device for display panel, and avoid the problem that the pin is stuck by other components because of the uneven pushing to cause the pin cannot contact the contact pad of the display panel, and reduce the defective rate of the display panel.

In order to solve the problems described above, an alignment process device for the display panel is provided in the present invention and includes a conductive component array, which comprises at least two conductive components, and the at least two conductive components are arranged together in a form of one dimensional array, the conductive component array is utilized to contact the display panel and provide power for the display panel; a base which is utilized to support the conductive components; a power source port connected to an external power source for providing power to the conductive components.

As the alignment process device for display panel described above, the conductive component includes a power source connective portion, a pin and an elastic stand, and the elastic stand includes an elastic portion, a fastened portion and a connective portion, the elastic portion includes a first end and a second end, the second end of the elastic portion is connected to the fastened portion by the connective portion, and the fastened portion is fastened in the base and the pin is fastened in the first end of the elastic portion, and the power source connective portion is disposed on the fastened portion.

As the alignment process device for display panel described above, the pin on the elastic portion is electrically connected to the power source connective portion on the fastened portion and the power source connective portion is electrically connected to the power source port.

As the alignment process device for display panel described above, the conductive component further includes an indicator light, a first conductive wire and a second conductive wire, and the first conductive wire is connected to the indicator light and the pin, and the second conductive wire is connected to the indicator light and the power source connective portion.

As the alignment process device for display panel described above, a first fastened structure is disposed on the fastened portion and the first fastened structure is utilized to fasten the conductive component and the base together.

As the alignment process device for display panel described above, a second fastened structure array is disposed on the base, and the second fastened structure array is utilized to couple to the first fastened structure so as to fasten the conductive component and the base together.

Another object of the present invention is to provide an alignment process device for display panel to increase the elastic shifting amount of the conductive component, adapt to the condition of the enforcement of the display panel, increase the anti-fatigue ability of the conductive component, increase the usage life cycle of the alignment process device for display panel, and avoid the problem that the pin is stuck by other components because of the uneven pushing to cause the pin cannot contact the contact pad of the display panel, and reduce the defective rate of the display panel.

A conductive component is provided in the present invention, and the conductive component includes a power source connective portion, a pin and an elastic stand, and the elastic stand includes an elastic portion, a fastened portion and a connective portion, the elastic portion includes a first end and a second end, the second end of the elastic portion is connected to the fastened portion by the connective portion, and the fastened portion is fastened in the base and the pin is fastened in the first end of the elastic portion, and the power source connective portion is disposed on the fastened portion.

As the conductive component described above, the pin on the elastic portion is electrically connected to the power source connective portion on the fastened portion and the power source connective portion is electrically connected to the power source port.

As the conductive component described above, the conductive component further includes an indicator light, a first conductive wire and a second conductive wire, and the first conductive wire is connected to the indicator light and the pin, and the second conductive wire is connected to the indicator light and the power source connective portion.

As the conductive component described above, a first fastened structure is disposed on the fastened portion and the first fastened structure is utilized to fasten the conductive component and the base together, and a second fastened structure array is disposed on the base, and the second fastened structure array is utilized to couple to the first fastened structure so as to fasten the conductive component and the base together.

By comparing to the conventional technique, the present invention can increase the elastic shifting amount of the conductive component, adapt to the condition of the enforcement of the display panel, increase the anti-fatigue ability of the conductive component, increase the usage life cycle of the alignment process device for display panel, and avoid the problem that the pin is stuck by other components because of the uneven pushing to cause the pin cannot contact the contact pad of the display panel and reduce the defective rate of the display panel.

The above-mentioned description of the present invention can be best understood by referring to the following detailed description of the preferred embodiments and the accompanying drawings.

DETAILED DESCRIPTION OF THE PREFERRED EMBODIMENTS

In the following detailed description of the preferred embodiments, reference is made to the accompanying drawings which form a part hereof, and as shown by way of illustration specific embodiments in which the invention may be practiced.

The technical problems required to solve in the present invention is: 1. enhancing the shifting value of the spring in the conductive component, and the conductive component properly contacts the contact pad on the display panel so as to adapt to the expansion and contraction quantity of the display panel; 2. enhancing the anti-fatigue ability of the conductive component to increase the usage life cycle of the alignment process device for display panel; 3. avoiding the pin is stuck by other components because of the uneven pushing force during the working procedure of the alignment process device for display panel and the pin cannot contact the touch pad of the display panel; 4. indicating a power supplying condition of the conductive component and the contact pad of the display panel to the operator.

Figure 1:
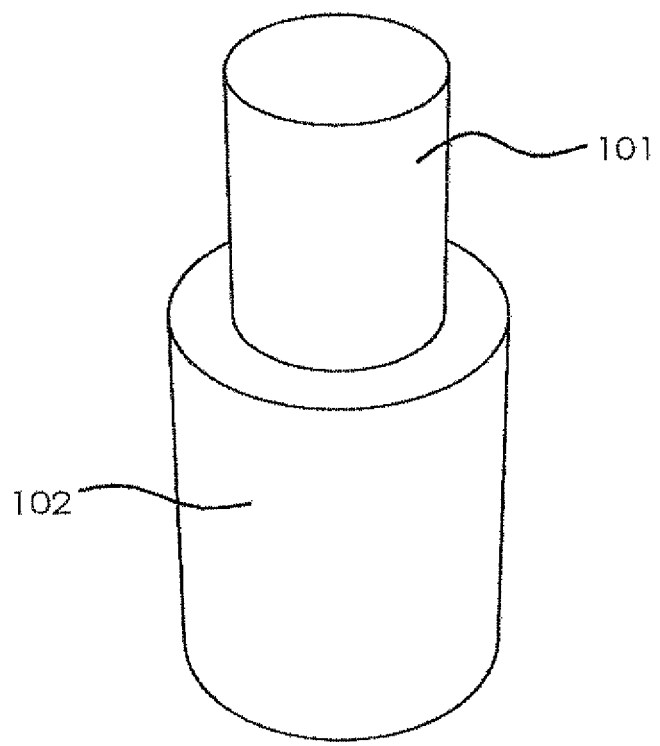
FIG. 1 is a view illustrating a conventional conductive component.
Figure 2:
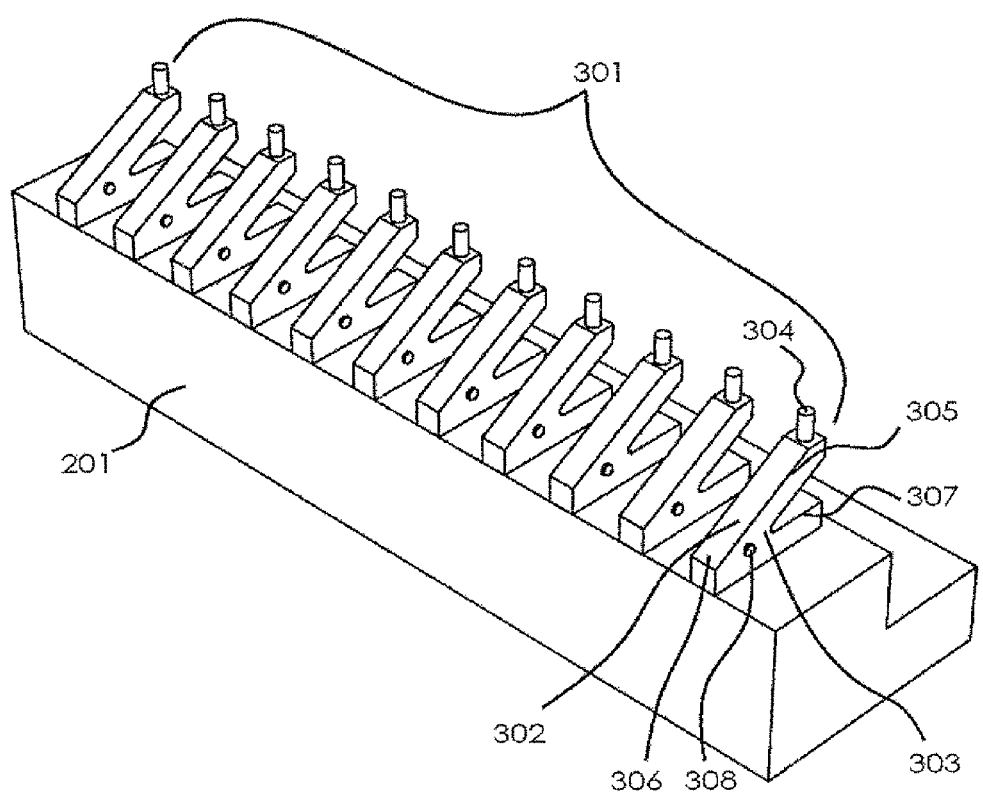
FIG. 2 is an isometric drawing illustrating an alignment process device for display panel in a first embodiment of the present invention.
Figure 3:
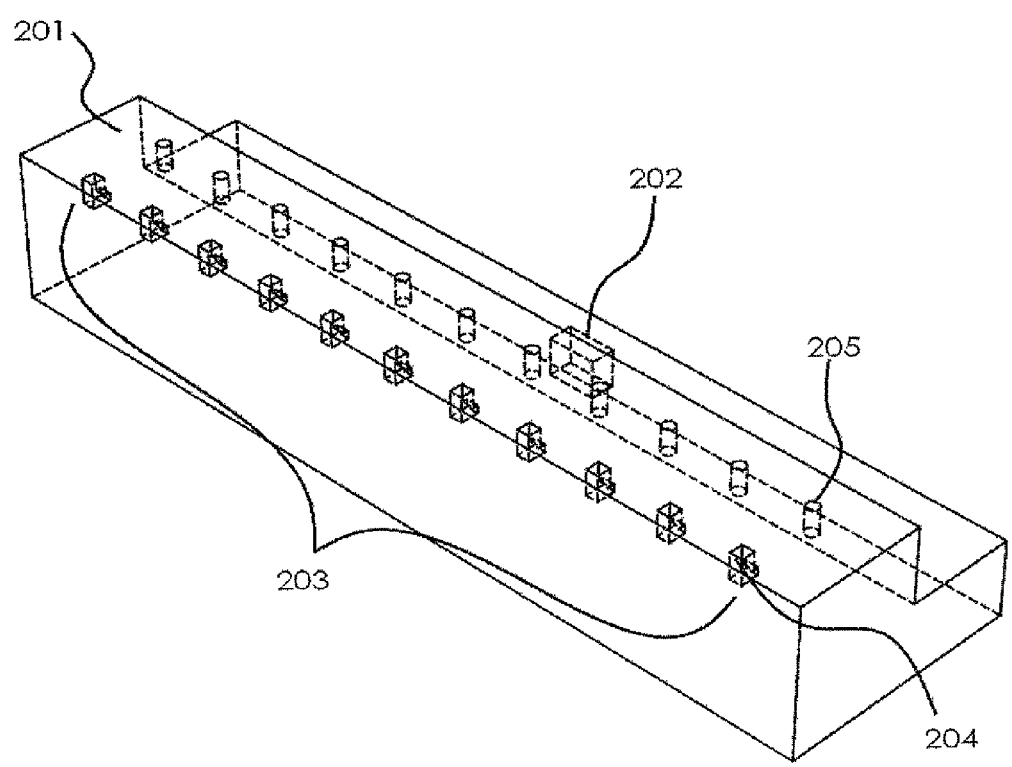
FIG. 3 is an isometric drawing illustrating a base in FIG. 2.
Figure 4:
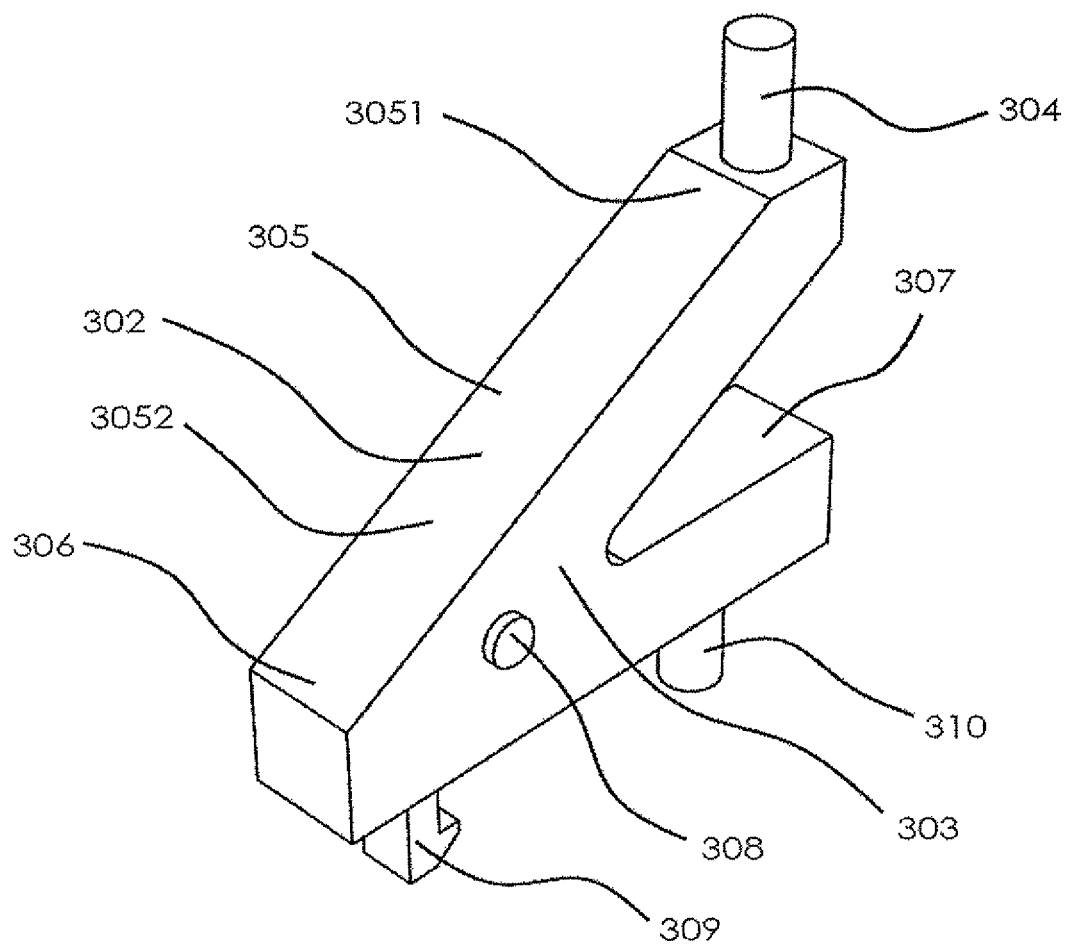
FIG. 4 is an isometric drawing illustrating a conductive component in FIG. 2.

Accordingly, the detail technical method of the present invention is described as the following:

Please refer to FIG. 2, FIG. 3, and FIG. 4, FIG. 2 is an isometric drawing illustrating an alignment process device for display panel in a first embodiment of the present invention. FIG. 3 is an isometric drawing illustrating a base 201 in FIG. 2. FIG. 4 is an isometric drawing illustrating a conductive component 302 in FIG. 2. The alignment process device for display panel in the present invention includes a conductive component array 301, a base 201 and a power source port 202. The conductive component array 301 and the power source port 202 are disposed on the base 201 and the power source port 202 is electrically connected to the conductive component array 301.

The conductive component array 301 includes at least two conductive components 302 and the two conductive components 302 are arranged together in a form of one dimensional array. The conductive component array 301 is utilized to contact a contact pad of the display panel and provide power from the contact pad to the display panel. The conductive component 302 includes a power source connective portion 310, a pin 304 and an elastic stand 303. The elastic stand 303 includes an elastic portion 305, a fastened portion 307 and a connective portion 306. The elastic portion 305 includes a first end 3051 and a second end 3052. The second end 3052 of the elastic portion 305 is connected to the fastened portion 307 by the connective portion 306. The fastened portion 307 and the base 201 are fastened together. The pin 304 is fastened in the first end 3051 of the elastic portion 305. Because the second end 3052 of the elastic portion 305 is connected to the fastened portion 307 by the connective portion 306 and the first end 3051 of the elastic portion 305 is opened, the first end 3051 of the elastic portion 305 can move back and forth within a predetermined range. In addition, the size of the elastic portion 305 can be made to be larger, and the elastic portion 305 is made to be a long shape along the length direction. Therefore, the first end 3051 of the elastic portion 305 can include a larger shifting value for the spring motion and the conductive component 302 can include a bigger elastic space. When the area where the pad disposed on the display panel includes a larger deformation amount, the conductive component can be adapted to the deformation amount to contact the contact pad of the display panel. Moreover, the elastic portion 305, which is utilized to make the conductive component 302 to include elastic property, will not be limited by the size of the conventional pin 101 or pin sleeve 102. Therefore, the elastic portion 305 is not required to minimize as the spring in the conventional conductive component to adapt to the pin sleeve 102 or the pin 101. Therefore, the elastic portion 305 of the conductive component 302 in the present invention can include higher strength and the anti-fatigue ability of the conductive component 302 is increased so as to increase the usage life cycle of the alignment process device for display panel in the present invention. In addition, because the pin 304 is fastened in the first end 3051 of the elastic portion 305 and the second end 3052 of the elastic portion 305 is fastened in the connective portion 306, the pin 304 won't be stuck by other objects during the working procedure of the alignment process device for display panel to avoid the condition that the pin 304 cannot contact the contact pad on the display panel. In the present invention, when the pin 304 of the conductive component 302 contact the display panel, the pin 304 can adapt to the condition that the contact pad of the display panel is rugged so as to guarantee that the pin 304 of the alignment process device for display panel can properly contact each of the contact pads of the display panel.

The power source connective portion 310 of the conductive component 302 is disposed on the fastened portion 307 of the elastic stand 303 and the power source connective portion 310 is electrically connected to the power source port 202. The power source port 202 is connected to an external power source for providing power to the conductive component 302. Practically, a socket 205, which includes a corresponding shape as the power source connective portion 310, is disposed on the base 201 and the power source connective portion 310 of the conductive component 302 is plugged in the socket 205 of the base 201 and the power source is conducted by the power source port 202. In addition, the pin 304 on the elastic portion 305 is electrically connected to the power source connective portion 310 on the fastened portion 307. The power source connective portion 310 is utilized to provide the power, which is received from the power port 202, to the pin 304. Practically, the pin 304 is electrically connected to the power source connective portion 310 by a wire (not shown), and the wire can be disposed within the elastic stand 303.

The conductive component 302 further includes an indicator light 308. The wire includes a first wire (not shown) and a second wire (not shown). The first wire is connected to the indicator light 308 and the pin 304, and the second wire is connected to the indicator light 308 and the power source connective portion 310. When the alignment process device for display panel in the present invention is connected to the power and the conductive component 302 contacts the contact pad of the display panel, the indicator light 308 will be turned on. Therefore, the conductive condition of the pin 304 and the contact pad of the display panel can be shown by the indicator light 308, and the operator can immediately know the connective condition of the alignment process device for display panel and the display panel to properly and immediately adjust so as to reduce the defective rate of the display panel.

In order to fasten the conductive component 302 on the base 201, a first fastened structure is disposed on the fastened portion 307, and the first fastened structure is utilized to fasten the conductive component 302 and the base 201 together. The base 201 is utilized to support and fasten the conductive component 302. Accordingly, a second fastened structure array 203 is disposed on the base 201, and the second fastened structure array 203 includes at least two second fastened structures and the at least two fastened structures are arranged together in a form of one dimensional array. The second fastened structure is utilized to couple to the first fastened structure so as to fasten the conductive component 302 and the base 201 together. The first fastened structure can be a spring buckle 309. Accordingly, the second fastened structure can be a spring fastened notch 204. The spring buckle 309 can be extended into the inner of the spring fastened notch 204 and hooks the spring fastened notch 204. In the present embodiment, the power source connective portion 310 is designed to be a pillar structure, so the conductive component 302 is easy to fasten on the base 201 by using the spring buckle 309.

Figure 5:
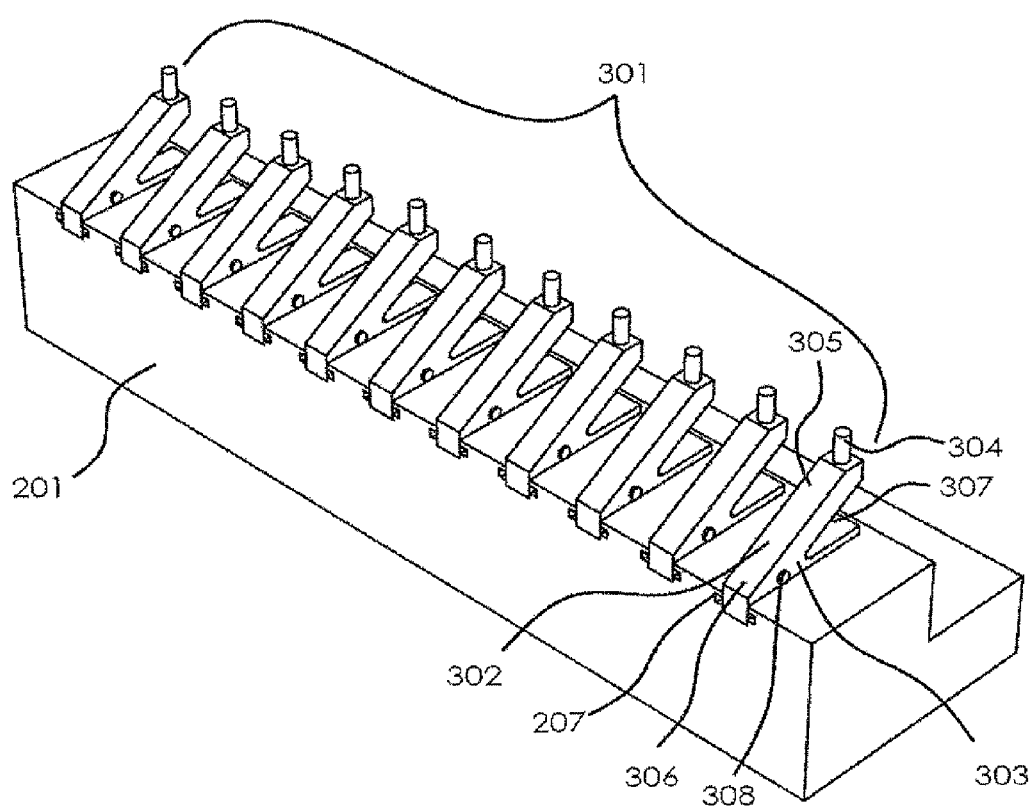
FIG. 5 is an isometric drawing illustrating an alignment process device for display panel in a second embodiment of the present invention.
Figure 6:
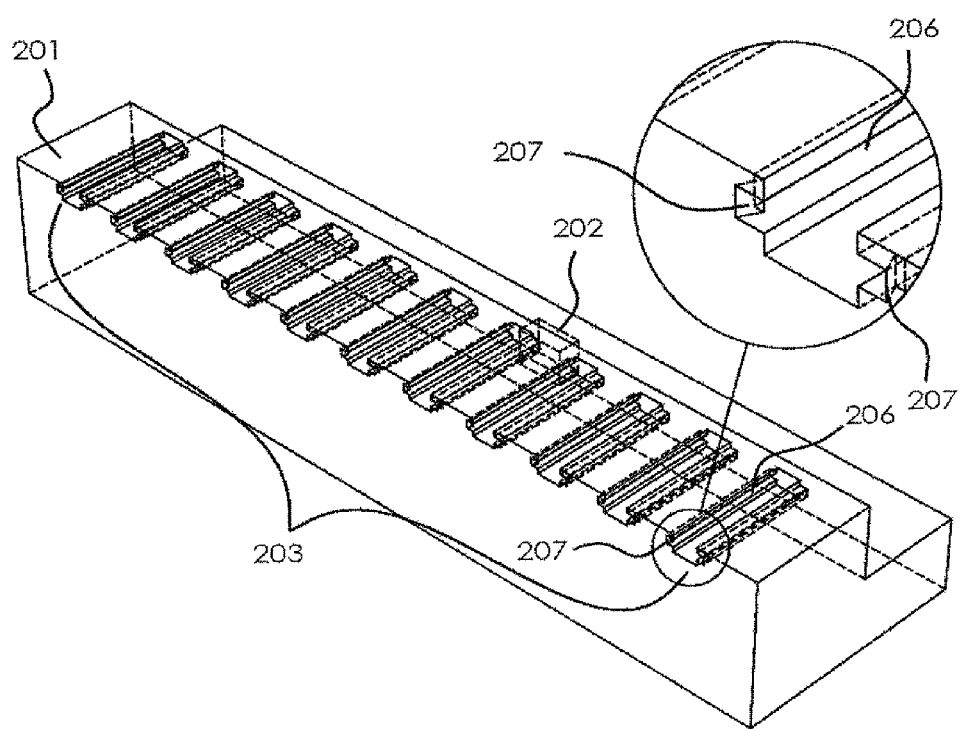
FIG. 6 is an isometric drawing illustrating a base in FIG. 5.
Figure 7:
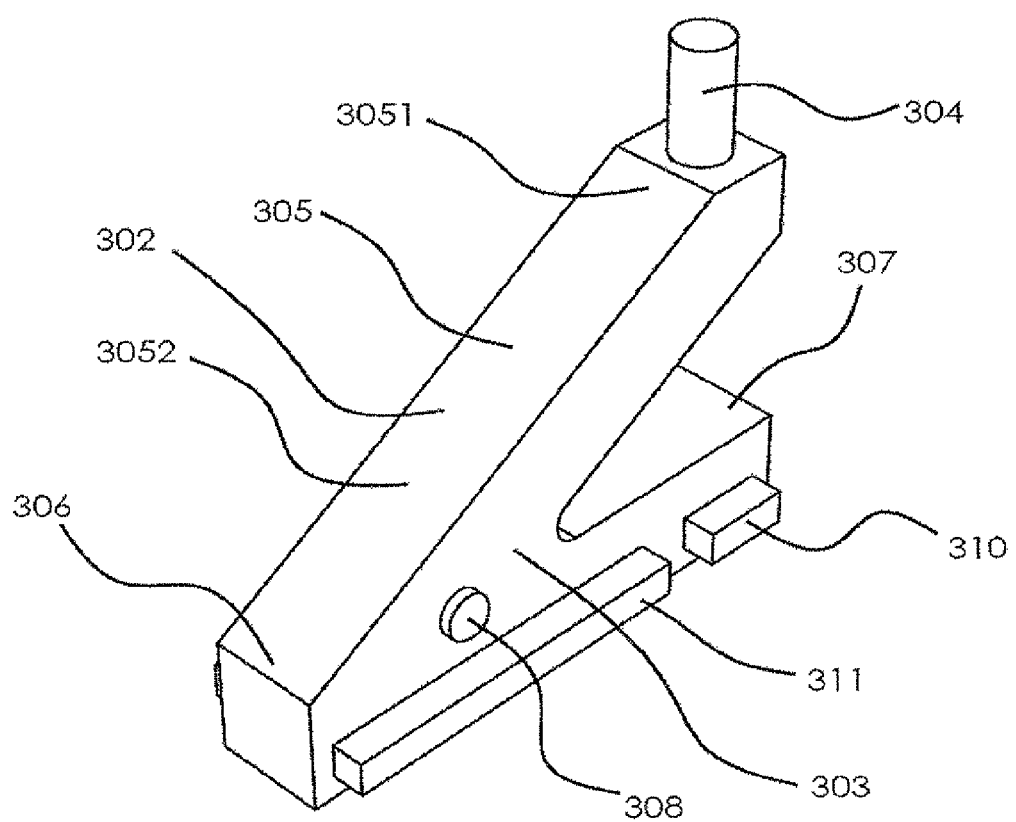
FIG. 7 is an isometric drawing illustrating a conductive component in FIG. 5.

In the practice of the alignment process device for display panel of the present invention, because the sizes of the display panels are not all the same, in order to adapt to the different sizes of the display panel, the alignment process device for display panel in the present invention increases the adapting range for the size of the display panel. Therefore, the alignment process device for display panel in the present invention can be made to be a detachable structure, and the number or the position of the conductive components 302 can be increased or decreased in accordance with the practical requirement. Practically, as shown in FIG. 5, FIG. 6 and FIG. 7, the base 201 and the conductive component 302 are designed to be able to glidingly install or detach in the alignment process device for display panel of the present invention. In order to detach and install the conductive component 302 on the base 201 conveniently, the first fastened structure of the fastened portion 307 of the conductive component 302 is a side wing 311, and the second fastened structure array 203 on the base 201 includes at least two sliding slots 206 with hooks 207. The sliding slots 206 with hooks 207 are utilized to embed the side wing 311 therein, and the hooks 207 are utilized to lock the side wing 311 to prevent the side wing 311 sliding out of the sliding slot 206.

In order to adapt to the sliding installation and detachment structure in the base 201 and the conductive component 302, the structure of the power source connective portion 310 is similar to the structure of the slide wing 311 and is arranged with the slide wing 311. A component utilized to provide power to the power source connective portion 310 is disposed within the sliding slot 206 (one end away from the opening) and the component is connected to the power source port 202.

Therefore, the practice of the alignment process for display panel can be improved in accordance with the practical requirement of the alignment process device for display panel in the present invention. When the small size display panel is doing the alignment process, a small amount of the conductive components 302 is reserved to use in the alignment process device for display panel. When the large size display panel is doing the alignment process, the amount of the conductive components 302 is increased to advance the alignment process for different sizes of the display panels.

As described above, the present invention has been described with preferred embodiments thereof and it is understood that many changes and modifications to the described embodiments can be carried out without departing from the scope and the spirit of the invention that is intended to be limited only by the appended claims.

What is claimed is:

1. An alignment process device for a display panel, comprising:
   a conductive component array comprising at least two conductive components, and the at least two conductive components being arranged together in a form of one dimensional array, each conductive component array being utilized for contacting the display panel to provide power for the display panel;
   a base for supporting the conductive components;
   a power source port connected to an external power source for providing power to the conductive components;
   each of the conductive components having a power source connective portion, a pin and an elastic stand, and the elastic stand having an elastic portion, a fastened portion and a connective portion, the elastic portion having a first end and a second end, the second end of the elastic portion being connected to the fastened portion by the connective portion, and the fastened portion being fastened in the base, the pin being fastened at the first end of the elastic portion, and the power source connective portion being disposed on the fastened portion;
   the power source connective portion being utilized for transmitting power received from the power source port to the pin;
   the pin on the elastic portion is electrically connected to the power source connective portion on the fastened portion, and the power source connective portion is electrically connected to the power source port.

2. The alignment process device for the display panel according to claim 1, wherein the conductive component further includes an indicator light, a first conductive wire and a second conductive wire, the first conductive wire is connected to the indicator light and the pin, and the second conductive wire is connected to the indicator light and the power source connective portion.

3. The alignment process device for the display panel according to claim 1, wherein a first fastened structure is disposed on the fastened portion and the first fastened structure is utilized for fastening the conductive component and the base together.

4. The alignment process device for the display panel according to claim 3, wherein a second fastened structure array is disposed on the base, and the second fastened structure array is utilized for coupling to the first fastened structure so as to fasten the conductive component and the base together.

5. A conductive component, including a power source connective portion, a pin and an elastic stand,
   wherein the elastic stand includes an elastic portion, a fastened portion and a connective portion, the elastic portion includes a first end and a second end, the second end of the elastic portion is connected to the fastened portion by the connective portion, the fastened portion is fastened together with the base and the pin is fastened in the first end of the elastic portion, and the power source connective portion is disposed on the fastened portion;
   the pin on the elastic portion is electrically connected to the power source connective portion on the fastened portion, and the power source connective portion is electrically connected to the power source port.

6. The conductive component according to claim 5, wherein the conductive component further includes an indicator light, a first conductive wire and a second conductive wire, the first conductive wire is connected to the indicator light and the pin, and the second conductive wire is connected to the indicator light and the power source connective portion.

7. The conductive component according to claim 5, wherein a first fastened structure is disposed on the fastened portion and the first fastened structure is utilized for fastening the conductive component and the base together, and a second fastened structure array is disposed on the base, and the second fastened structure array is utilized for coupling to the first fastened structure so as to fasten the conductive component and the base together.

* * * * *